(12) United States Patent
Nilsson (10) Patent No.: US 6,457,630 B1
(45) Date of Patent: Oct. 1, 2002

(54) TANK TRAILER CONSTRUCTION

(75) Inventor: Allan K. Nilsson, Azle, TX (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 09/608,433

(22) Filed: Jun. 30, 2000

(51) Int. Cl.[7] ............................................... B23K 31/02
(52) U.S. Cl. ...................................... 228/184; 228/135
(58) Field of Search .............................. 228/184, 135, 228/175, 178, 182, 185; 280/5, 5 E, 5 C; 214/83.28; 220/1, 1.5, 564, 562, 563; 105/239, 247, 248, 358, 364; 298/24, 27; 296/15; 222/566; 52/192, 197

(56) References Cited

U.S. PATENT DOCUMENTS

| | | |
|---|---|---|
| 2,290,221 A | 7/1942 | Winsor |
| 2,780,369 A | 2/1957 | Kaney |
| 3,000,530 A | 9/1961 | Carlsen |
| 3,058,753 A | 10/1962 | Carlsen |
| 3,080,173 A | 3/1963 | Johnson et al. |
| 3,558,005 A * | 1/1971 | Crabtree et al. ............... 221/90 |
| 4,021,982 A * | 5/1977 | Kotcharian ................... 52/410 |
| 4,098,425 A * | 7/1978 | Yamamoto ................... 220/403 |
| 4,258,953 A | 3/1981 | Johnson |
| 4,346,905 A | 8/1982 | Smetancik |
| 4,459,070 A * | 7/1984 | Bourgeois ..................... 406/90 |
| 4,600,139 A * | 7/1986 | Murase ....................... 228/184 |
| 4,653,659 A * | 3/1987 | Bersani ....................... 220/1.5 |
| 4,823,707 A * | 4/1989 | Salsbury et al. ............. 105/377 |
| 5,199,632 A * | 4/1993 | Takeichi et al. ............. 228/181 |
| 5,570,801 A * | 11/1996 | Younger ....................... 220/1.5 |
| 5,819,970 A * | 10/1998 | Solimar ....................... 220/1.5 |
| 5,911,337 A * | 6/1999 | Bedeker ....................... 220/562 |
| 6,189,723 B1 * | 2/2001 | Davis et al. .................. 220/586 |

OTHER PUBLICATIONS

Heil Trailer International brochure—Standard Specifications Model 1600 Super Jet Lite Aluminum 4—Hopper Pneumatic.
Heil Trailer International brochure—Super Jet.

* cited by examiner

*Primary Examiner*—Tom Dunn
*Assistant Examiner*—Zidia Pittman
(74) *Attorney, Agent, or Firm*—Chambliss, Bahner & Stophel (57) ABSTRACT

An improved method for constructing a container having at least three panels, all of which intersect at a common point and each adjacent pair of which intersect along a line, includes welding each adjacent pair of panels to join them together by placing a weld along the intersecting line between such panels to a weld-terminating point spaced from the common intersecting point of the panels. A patch component its provided to cover the common intersecting point and each weld-terminating point, and to intersect with each panel along a line. The patch component is then welded to each of the panels by placing a weld along the line of intersection with each panel.

8 Claims, 6 Drawing Sheets

TANK TRAILER CONSTRUCTION

FIELD OF THE INVENTION

This invention relates generally to the construction of tanks or containers for granular or fluent particulate materials. More particularly, the invention relates to the construction of a trailer-mounted tank having at least one product compartment that is capable of being pressurized for discharge or unloading of the product therefrom.

BACKGROUND AND DESCRIPTION OF THE PRIOR ART

Many granular or fluent particulate materials are conveniently transported by truck, although they may also be transported by railcar, barge or by other means. Trucks that are used to transport such materials may include a tractor and an attached trailer having a tank or other container mounted thereon. Frequently, these trailers are referred to as pneumatic tank trailers because of the pneumatic method, involving gas-or air-entrainment, by which they may be loaded and unloaded. Materials that are generally transported in pneumatic tank trailers include agricultural products such as grain, corn kernels, beans, flour, sugar, peanuts and the like, and intermediate products for various industrial uses such as plastic pellets, coke, lime, silica gel, powdered acid resins, rare earth powders and powdered alumina, and many others.

Pneumatic tank trailers include one or more product tanks or compartments which are generally enclosed by a sheet metal sheath. Because these pneumatic trailers are generally unloaded by a method which involves pressurizing the product compartments, the compartments are usually cylindrical or spherical in shape. Such shape also insures that the compartments can be easily and completely emptied. Each of the product compartments is provided with a discharge hopper that may be generally cylindrical or conical in shape, and the external sheath provides an aerodynamically efficient outer tank surface which may include end sections that are tapered.

One type of known construction of such pneumatic trailers includes a container comprised of a generally cylindrical and horizontally disposed upper central section to which are attached first and second conical ends. A lower central section is defined by one or more cylindrical or conical product compartments, the axes of which intersect the upper central section generally at right angles to the axis of the cylinder of the upper central section. The lower central section also includes an unloading system having a valve for each product compartment and a conduit extending from the valve to permit unloading of the compartment under pressure. The container is mounted on a frame which is supported by the chassis of a trailer.

The various components of the container are formed of metal sheets or panels which are welded together. The end sections are welded to the upper and lower central sections, and the upper and lower central sections are welded together. This construction of complex shapes resulting from the joining of the cylindrical upper central section and the cylindrical or conical lower central section creates stress risers in the container. In addition, welding of these various metal panels in the construction of the container changes the stiffness of the panels and creates additional stress risers. Furthermore, the construction of the conventional container includes several adjacent panels having welded joints that terminate at a common point. Because several welded joints are made close together in such construction, the area of each panel in the immediate vicinity of the common termination point of the welds is repeatedly subjected to the rapid heating to a high temperature that is an inevitable result of welding. Residual stresses or annealing effects from welding of these adjacent panels to a common termination point may affect their fatigue strength and buckling strength. Furthermore, the tensile or compressive strength of some joints may be reduced in the heat-affected zones adjoining the welds. Since the containers are subjected to cycles of pressurization and de-pressurization upon loading and unloading of product, and since the welded joints are subjected to fatigue caused by this cyclic loading and unloading of the product and also to vibrations caused by product transport, the joint in the heat-affected zone of each panel in the vicinity of the common weld termination point may fail after relatively few such cycles.

It would be desirable, therefore, if a construction technique could be developed for such containers that would minimize the creation or development of heat-induced fatigue in the panels which make up the container surface. It would also be desirable if such a construction technique could be developed that would permit the welding of adjacent panels having complex shapes while avoiding the placement of a plurality of welds in a relatively small area of the container surface.

ADVANTAGES OF THE INVENTION

Among the advantages of the invention is that it allows for the construction of efficiently shaped containers comprised of a plurality of panels in a manner that minimizes the creation or development of heat-affected zones and stress risers in the panels from welding. Another advantage of the invention is that it permits the welding of adjacent panels having complex shapes while avoiding the placement of a plurality of welds in a relatively small area of the container surface.

Additional objects and advantages of this invention will become apparent from an examination of the drawings and the ensuing description.

EXPLANATION OF TECHNICAL TERMS

As used herein, the term "generally cylindrical", as used to modify a component or components, refers to components comprised of cylinders having cross-sections that are wholly or partially cylindrical or elliptical, as well as polyhedral components such as those having cross-sections that are triangular, square, rectangular, hexagonal, octagonal, or of other similar shape.

As used herein, the term "fatigue" refers to the phenomenon leading to fracture under repeated or fluctuating stresses having a maximum value less than the tensile strength of the material. Fatigue fractures are progressive, beginning as minute cracks that grow under the action of the fluctuating stress.

As used herein, the term "heat-induced fatigue" refers to fatigue occurring in panels or other components that is caused by or contributed to by residual stresses or annealing effects from welding of such panels or components.

As used herein, the term "welding" refers to the joining of two or more pieces of material by applying heat or pressure, or both, with or without filler material, to produce a localized union through fusion or recrystallization across the interface. A union made by welding is a weld.

SUMMARY OF THE INVENTION

The invention comprises an improvement in a method for constructing a container having at least three panels, all of which intersect at a common point and each adjacent pair of which intersect along a line. The improvement comprises: (a) welding each adjacent pair of panels to join them together by placing a weld along the intersecting line between such panels to a weld-terminating point spaced from the common intersecting point of the panels, (b) providing a patch component that is adapted to cover the common intersecting point and each weld-terminating point and to intersect with each panel along a line, and (c) welding the patch component to each of the panels by placing a weld along the line of intersection with each panel.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
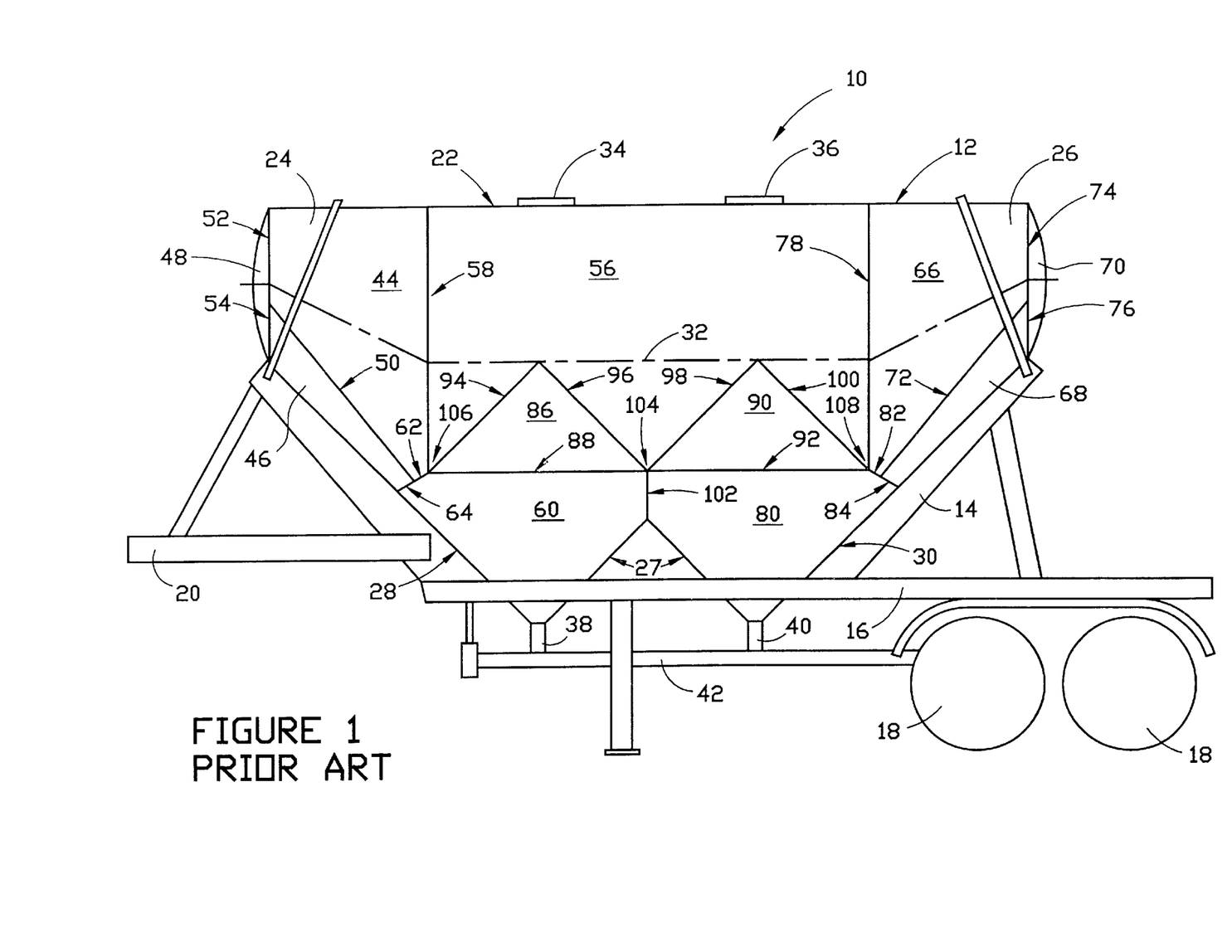
FIG. 1 is a side view of a pneumatic tank trailer of conventional construction.

FIG. 1 illustrates conventional pneumatic tank trailer 10, which includes container 12 that is mounted on frame 14 which is supported by chassis 16. Wheels 18 are mounted to the chassis, and hitch 20 is provided for coupling of the trailer to a tractor so that it may be moved from place to place. Container 12 is comprised of a generally cylindrical and horizontally disposed upper central section 22 to which are attached first conical end 24 and second conical end 26. A lower central section 27 is defined by a pair of conical product compartments 28 and 30. The conical product compartments are oriented with respect to the generally cylindrical upper central section so that their axes generally intersect at right angles with axis 32 of the upper central section. Access ports 34 and 36 are provided for loading of material into the product compartments. The lower central section also includes an unloading system having valves 38 and 40 for the product compartments and conduit 42 extending from the valves to permit unloading of the compartments under pressure.

The components of container 12 are preferably made of metal panels such as aluminum panels that are about 0.20–0.25 inches thick. Steel panels can also be used, of comparable or slightly lesser thickness. Container 12 can be of any desired height, width and length that is suitable for over-the-road travel, and can include one, two or more product compartments. Generally, the interior of container 12 is hollow, except for internal supports that help to maintain its shape during pressurization and de-pressurization. Generally, the panels of container 12 are welded together. Because container 12 is comprised of a generally cylindrical and horizontally disposed upper central section 22 to which are attached conical product compartments 28 and 30, the panels which comprise upper section 22 and compartments 28 and 30 have complex surface shapes. These complex surface shapes also contribute to the overall aerodynamic efficiency of tank trailer 10. Because the surfaces of at least some of these panels are not planar, the lines of intersection along which the welds between the panels are placed may be curvilinear.

Figure 2:
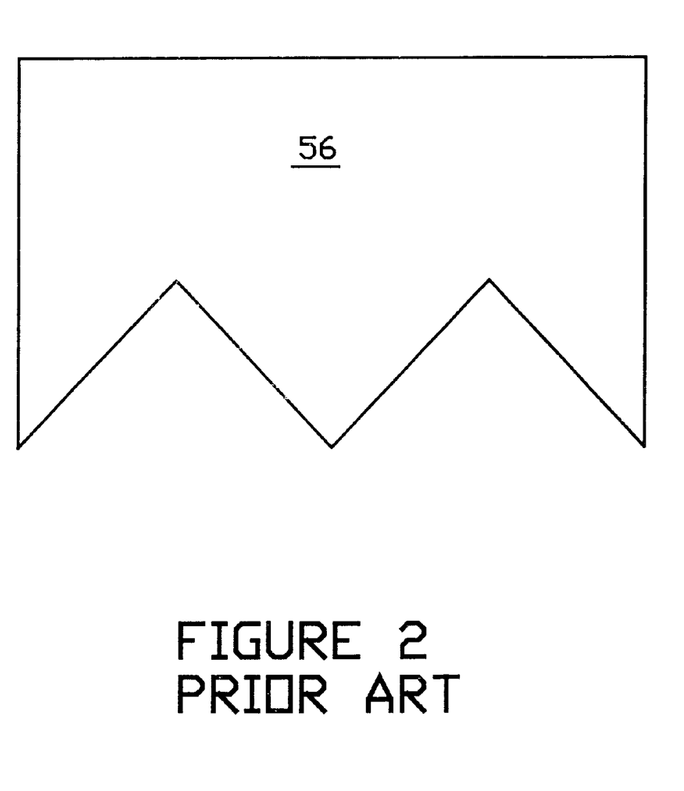
FIG. 2 is a side view of a panel of the container of the pneumatic tank trailer of FIG. 1.
Figure 3:
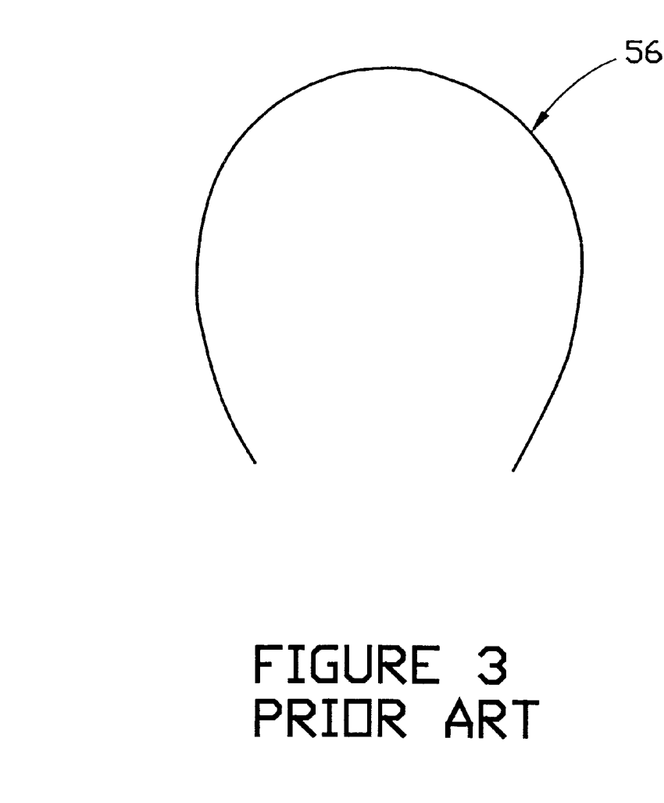
FIG. 3 is an end view of the panel of FIG. 2.

As shown in FIG. 1, end section 24 of container 12 is comprised of upper panel 44, lower panel 46 and end cap panel 48. The upper and lower panels of end section 24 are welded together along a pair of intersecting lines, one of which (50) is illustrated in FIG. 1. End cap panel 48 is welded to upper panel 44 along intersecting line 52 and to lower panel 46 along intersecting line 54. Upper panel 44 is also welded to panel 56 of upper central section 22 (also illustrated in FIGS. 2 and 3) along intersecting line 58, and to panel 60 of conical product compartment 28 along intersecting line 62. Lower panel 46 is also welded to panel 60 of conical product compartment 28 along intersecting line 64.

End section 26 is comprised of upper panel 66, lower panel 68 and end cap panel 70. The upper and lower panels of end section 26 are welded together along a pair of intersecting lines, one of which (72) is illustrated in FIG. 1. End cap panel 70 is welded to upper panel 66 along intersecting line 74 and to lower panel 68 along intersecting line 76. Upper panel 66 is also welded to panel 56 of upper central section 22 along intersecting line 78 and to panel 80 of conical product compartment 30 along intersecting line 82. Lower panel 68 is also welded to panel 80 of conical product compartment 30 along intersecting line 84.

Panel 86 of lower central section 28 is welded to panel 60 along line 88, and panel 90 of conical product compartment 30 is welded to panel 80 along line 92. Panel 56 of upper central section 22 is welded to panel 86 of conical product compartment 28 along lines 94 and 96. Panel 56 is also welded to panel 90 of conical product compartment 30 along lines 98 and 100. Panels 60 and 80 are welded together along intersection line 102. Because of the complex shapes which result from the intersections of the cylindrical upper central section and the conical product construction includes several adjacent panels having welded joints that terminate at a common point. For example, intersecting lines 88, 96, 98, 92 and 102 all intersect at common point 104. Such point may also be described as the common intersecting point of panels 60, 86, 56, 90 and 80. Similarly, intersecting lines 62, 58, 94 and 88 all intersect at common point 106, and intersecting lines 82, 92, 100 and 78 all intersect at common point 108. Point 106 may be described as the common intersecting point of panels 44, 56, 86 and 60, and point 108 may be described as the common intersecting point of panels 66, 80, 90 and 56. Because several welded joints are made close together in the conventional construction of FIG. 1, the areas of each of panels 60, 86, 56, 90 and 80 in the immediate vicinity of common termination point 104, the areas of each of panels 44, 56, 86 and 60 in the immediate vicinity of common termination point 106, and the areas of each of panels 66, 80, 90 and 56 in the vicinity of common point 108 are subjected to repeated rapid heating to a high temperature that is an inevitable result of welding along the lines of intersection between the panels. Residual stresses or annealing effects from welding of these adjacent panels to their common termination points may affect their fatigue strength and buckling strength. Furthermore, the tensile or compressive strength of some of the joints between the panels may be reduced in the heat-affected zones adjoining the welds. Since the containers are subjected to cycles of pressurization and de-pressurization upon loading and unloading of product, and since the welded joints are subjected to fatigue caused by this cyclic loading and unloading of product and also to vibrations caused by product transport, the joint in the heat-affected zone of each panel in the vicinity of the common termination point may fail after relatively few such cycles.

Figure 4:
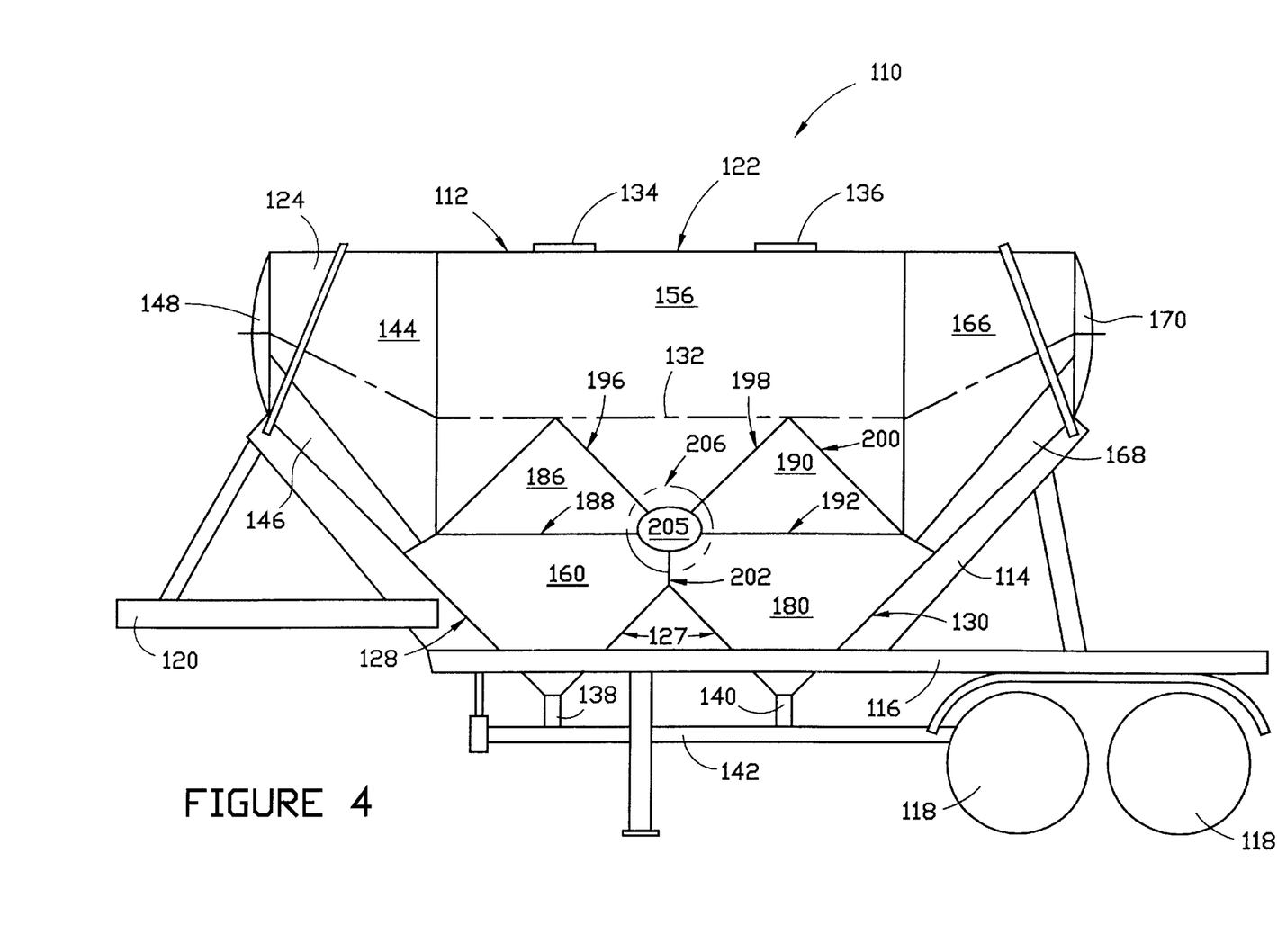
FIG. 4 is a side view of a pneumatic tank trailer similar to that of FIG. 1, the container of which has been constructed according to the improved method of the invention.

FIGS. 4 through 7 illustrate a solution to this problem. As shown in FIG. 4, pneumatic tank trailer 110 includes components that are essentially identical to those of tank trailer 10. Thus, trailer 110 includes container 112 that is mounted on frame 114 which is supported by chassis 116. Wheels 118 are mounted to the chassis, and hitch 120 is provided for coupling of the trailer to a tractor so that it may be moved from place to place. Each of these components is identical to the corresponding component of trailer 10 except for the container. Thus, although container 112 is similar in construction to container 12, and although it may be constructed of the same materials as container 12, it is not identical thereto. Container 112 is comprised of a generally cylindrical and horizontally disposed upper central section 122 to which are attached first conical end 124 and second conical end 126. A lower central section 127 is defined by a pair of conical product compartments 128 and 130, and the axes of these conical compartments intersect axis 132 of the cylinder of the upper central section generally at right angles thereto. Access ports 134 and 136 are provided for loading of material into the product compartments. The lower central section also includes an unloading system having valves 138 and 140 for the product compartments and conduit 142 extending from the valves to permit unloading of the compartments under pressure.

The panels of preferred container 112 are generally identical to those of container 12 and, like those of container 12, the panels of container 112 are generally welded together along adjacent lines of intersection. Thus, the panels of end sections 124 and 126 are generally welded together, and to panel 156 of upper central section 122, as well as to panels 160 and 180 of the conical product compartments, in the same manner as the panels of end sections 24 and 26 of container 12 are welded together and to panels 56, 60 and 80.

As shown in FIG. 4, there are several portions of container 112 which include at least three panels, all of which intersect at a common point and each adjacent pair of which intersect along a line. In such circumstances, the invention contemplates welding each adjacent pair of panels to join them together by placing a weld along the intersecting line between such panels to a weld-terminating point spaced from the common intersecting point of the panels. Preferably, each weld-terminating point is located so as to minimize the portion of each panel near the common intersecting point that is subject to heat-induced fatigue. A patch component is provided to cover the common intersecting point and each weld-terminating point. The patch component also intersects with each panel along a line at its periphery. The patch component is then welded to each of the panels by placing a weld along the line of intersection of the patch component with each panel. The invention also contemplates that a portion of each panel between the common intersecting point and the weld-terminating point may be removed before application of the patch component.

Figure 5:
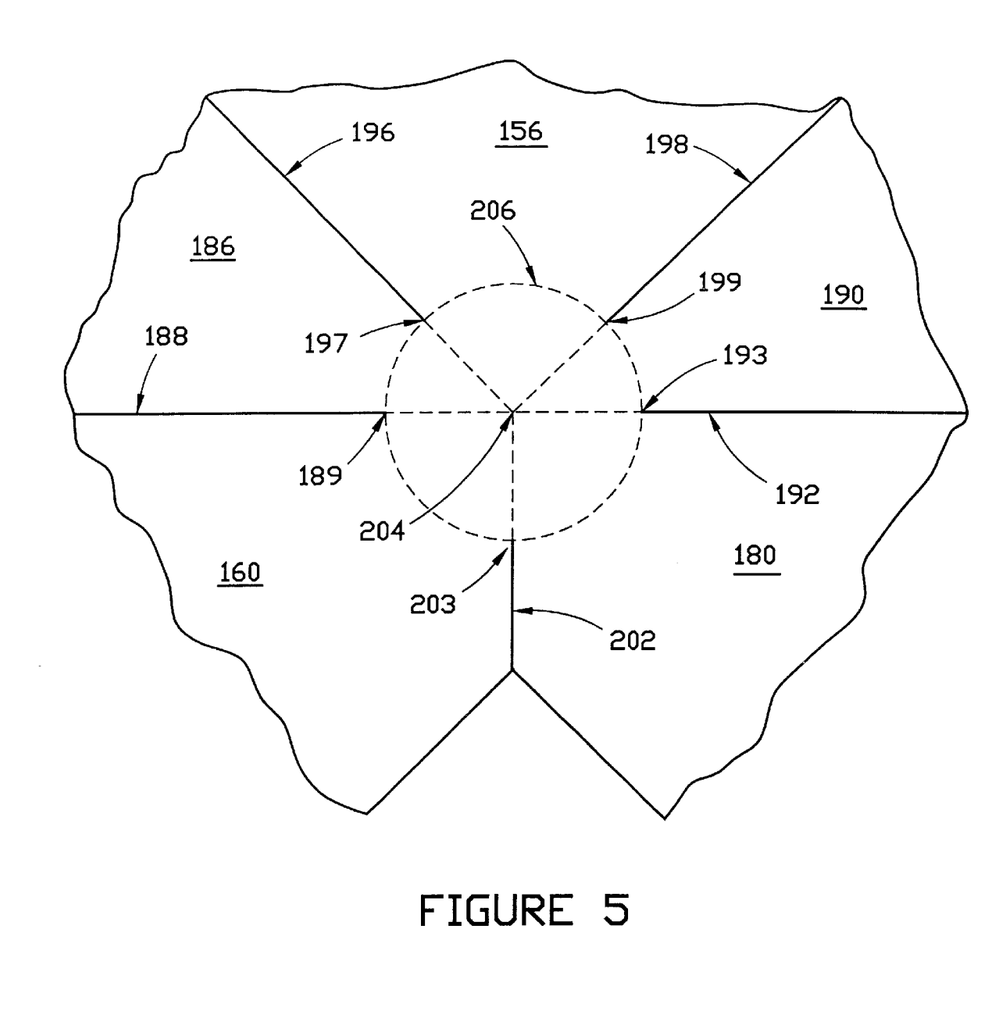
FIG. 5 is an enlarged view of a portion of FIG. 4, before the patch component of the invention is applied.
Figure 6:
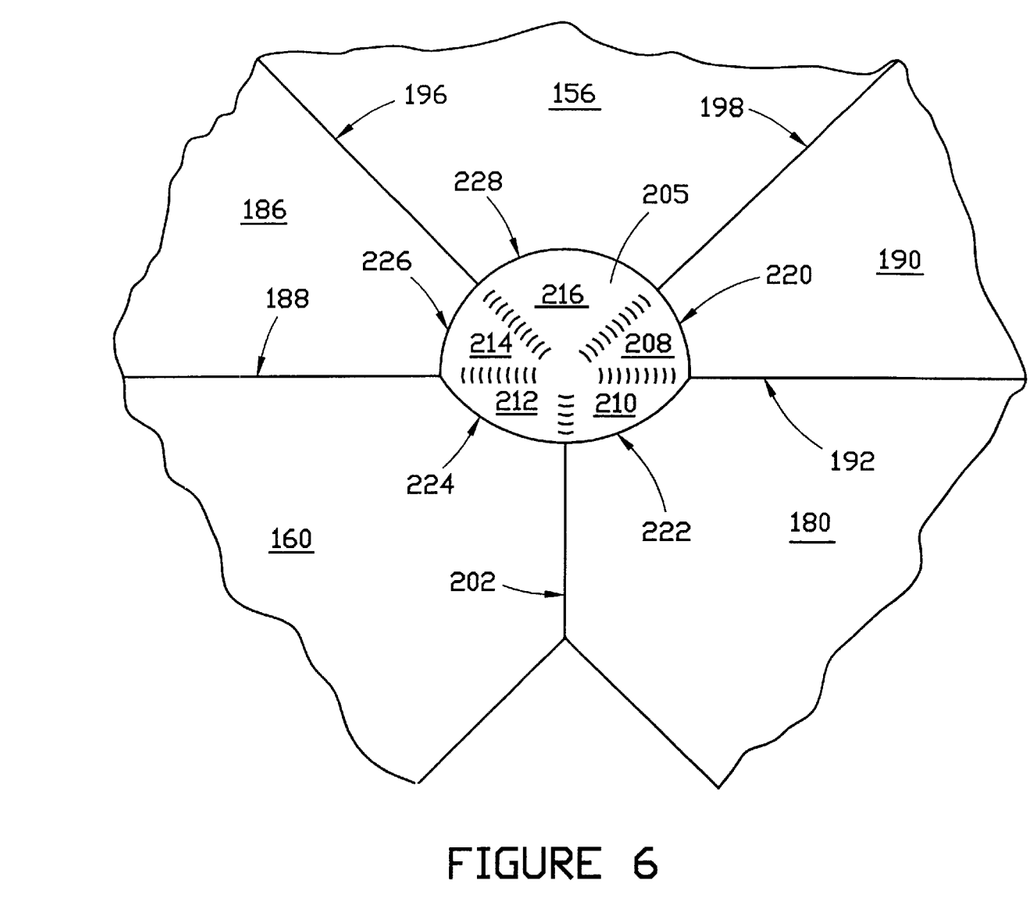
FIG. 6 is an enlarged view of a portion of FIG. 4, after application of the patch component of the invention.
Figure 7:
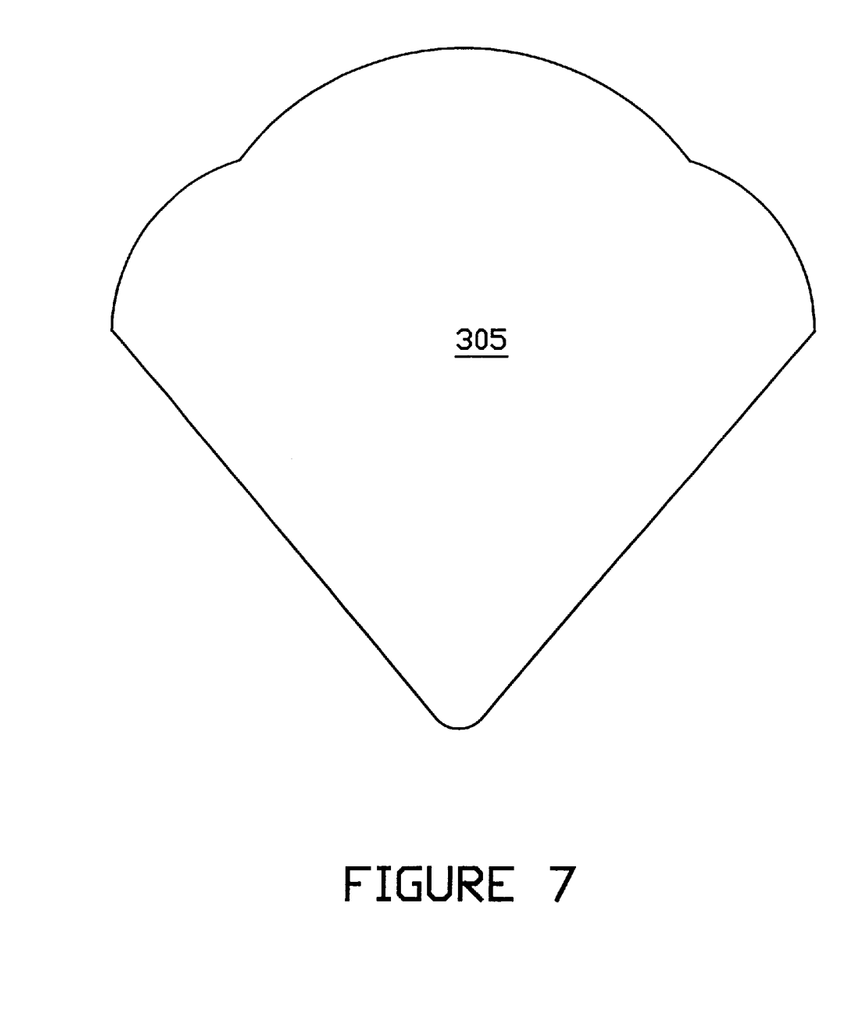
FIG. 7 is a plan view of a blank which may be stamped to form a patch component that may be utilized in accordance with a preferred embodiment of the invention.

FIGS. 4 and 6 illustrate the application of patch 205, according to the invention, to cover common termination point 204 (see FIG. 5) of panels 160, 180, 190, 156 and 186, and FIG. 5 illustrates the steps of the invention prior to application of the patch. As shown in FIG. 5, panel 186 of lower central section 128 is welded to panel 160 along line 188 to weld-terminating point 189. Panel 190 of conical product compartment 130 is welded to panel 180 along line 192 to weld-terminating 193. Panel 156 of upper central section 122 is welded to panel 186 of conical product compartment 128 along line 196 to weld-terminating point 197. Panel 156 is also welded to panel 190 of conical product compartment 130 along line 198 to weld-terminating point 199. Panels 160 and 180 are welded together along intersection line 202 terminating points 189, 193, 197, 199 and 203 are spaced from common intersecting point 204 so as to minimize the portion of each panel near the common intersecting point that is subject to heat-induced fatigue. Such spacing creates a weld-free zone 206 which includes a portion of each of the intersecting panels. After the welding of each adjacent pair of panels to join them together by placing a weld along the intersecting line between such panels to a weld-terminating point spaced from the common intersecting point of the panels, patch component 205 is placed over zone 206, as shown in FIG. 6. Although the patch component may be provided in any convenient surface configuration, it is preferred that the patch component have a plurality of conforming surfaces, one for each panel, in order that the patch component will not adversely affect the aerodynamic characteristics of the container. Thus, surface 208 preferably conforms to the contours of panel 190, surface 210 preferably conforms to the contours of panel 180, surface 212 preferably conforms to the contours of panel 160, surface 214 preferably conforms to the contours of panel 186, and surface 216 preferably conforms to the contours of panel 156. FIG. 7 illustrates the shape of blank component 305 that may be stamped or otherwise formed into preferred patch component 205 having the appropriate surface contours.

Patch component 205 is then welded to each of panels 156, 190, 180, 160 and 186 by placing a weld along the line of intersection of the patch component with each panel. Thus, as shown in FIG. 6, a weld is placed along line 220 where the periphery of patch component 205 intersects panel 190, and another weld is placed along line 222 where the periphery of patch component 205 intersects panel 180. In addition, a weld is placed along line 224 where the periphery of patch component 205 intersects panel 160, and another weld is placed along line 226 where the periphery of patch component 205 intersects panel 186. Finally, a weld is placed along line 228 where the periphery of patch component 205 intersects panel 156.

Because the invention avoids the creation of several closely spaced welded joints in the areas of each of panels 156, 190, 180, 160 and 186 in the immediate vicinity of common termination point 204, such panels are not subjected to repeated rapid heating to a high temperature that is an inevitable result of welding along the lines of intersection between the panels to the common intersecting point. Zone 206 of container 112 will thereby avoid heat-induced fatigue from multiple welds that could lead to early failure.

Although the invention has been described as applied to a common intersecting point between panels such as point 104 of FIG. 1, it is equally applicable to other common intersecting points between and among three or more panels, such as, for example, points 106 and 108 of FIG. 1.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. In a method for constructing a container having at least three panels, all of which intersect at a common point and each adjacent pair of which intersect along a line, the improvement which comprises:
   (a) welding each adjacent pair of panels to join them together by placing a weld along the intersecting line between such panels to a weld-terminating point spaced from the common intersecting point of the panels;
   (b) providing a patch component that is adapted to cover the common intersecting point and each weld-terminating point and to intersect with each panel along a line;
   (c) welding the patch component to each of the panels by placing a weld along the line of intersection with each panel.

2. The improved method of claim 1 which includes locating the weld-terminating points so as to minimize the portion of each panel near the common intersecting point that is subject to heat-induced fatigue.

3. The improved method of claim 1 which includes providing a patch component having a plurality of conforming surfaces, one for each panel.

4. The improved method of claim 1 which includes removing a portion of each panel between the common intersecting point and the weld-terminating point.

5. In a method for constructing a container capable of being pressurized and having at least three non-planar panels, all of which intersect at a common point and each adjacent pair of which intersect along a line, the improvement which comprises:
   (a) welding each adjacent pair of panels to join them together by placing a weld along the intersecting line between such panels to a weld-terminating point spaced from the common intersecting point of the panels;
   (b) providing a patch component having a plurality of conforming surfaces, one for each panel, which component is adapted to cover the common intersecting point and each weld-terminating point and to intersect with each panel along a line;
   (c) welding the patch component to each of the panels by placing a weld along the line of intersection with each panel.

6. The improved method of claim 5 which includes locating the weld-terminating points so as to minimize the portion of each panel near the common intersecting point that is subject to heat-induced fatigue.

7. The improved method of claim 5 which includes removing a portion of each panel between the common terminating point and the weld-terminating point.

8. In a method for constructing a container for containing granular or fluent particulate materials under pressure, which container includes at least three non-planar panels comprised of at least two adjacent pairs of panels, all of which panels intersect at a common point and each adjacent pair of which intersect along a line, said container comprising:
   (a) a generally cylindrical upper central section having a first end and a second end and a generally horizontally disposed axis;
   (b) a first conical end which is attached to the first end of the upper central section;
   (c) a second conical end which is attached to the second end of the upper central section;
   (d) a lower central section defined by at least one cylindrical or conical product compartment, the axis of which intersects the axis of the upper central section generally at right angles thereto;

wherein the improvement comprises:
   (e) welding each adjacent pair of panels to join them together by placing a weld along the intersecting line between such panels to a weld-terminating point spaced from the common intersecting point of the panels;
   (f) providing a patch component having a plurality of conforming surfaces, one for each panel, which component is adapted to cover the common intersecting point and each weld-terminating point and to intersect with each panel along a line;
   (g) welding the patch component to each of the panels by placing a weld along the line of intersection with each panel.

* * * * *

UNITED STATES PATENT AND TRADEMARK OFFICE
CERTIFICATE OF CORRECTION

PATENT NO. : 6,457,630 B1
DATED : October 1, 2002
INVENTOR(S) : Allan K. Nilsson It is certified that error appears in the above-identified patent and that said Letters Patent is hereby corrected as shown below:

Column 4,
Line 52, add -- compartments, such -- after the word "product"

Column 6,
Line 12, delete "lower central section 128" and substitute therefor -- conical product compartment 128 --
Line 21, add -- to weld-terminating point 203. Weld -- after the term "intersection line 202"

Signed and Sealed this

Eighteenth Day of March, 2003

JAMES E. ROGAN
*Director of the United States Patent and Trademark Office*